United States Patent
Mittal, I et al.

(10) Patent No.: US 9,432,572 B2
(45) Date of Patent: Aug. 30, 2016

(54) METHOD AND APPARATUS FOR AUTOMATIC PREDICTION OF DYNAMIC EXPOSURE

(71) Applicant: HERE Global B.V., Veldhoven (NL)

(72) Inventors: Anish Mittal, I, Berkeley, CA (US); Taufiq Habib, Lafayette, CA (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 14/556,600

(22) Filed: Dec. 1, 2014

(65) Prior Publication Data

US 2016/0156841 A1    Jun. 2, 2016

(51) Int. Cl.
    *H04N 5/232*    (2006.01)
    *H04N 5/235*    (2006.01)

(52) U.S. Cl.
    CPC ........ *H04N 5/23222* (2013.01); *H04N 5/2353* (2013.01)

(58) Field of Classification Search
    CPC ................ H04N 5/23222; H04N 5/2353
    USPC ...................................................... 348/222.1
    See application file for complete search history.

(56) References Cited

U.S. PATENT DOCUMENTS

| | | | |
|---|---|---|---|
| 7,667,763 B2 | 2/2010 | Kobayashi | 348/362 |
| 8,040,410 B2 | 10/2011 | Arai et al. | 348/254 |
| 8,149,283 B2 | 4/2012 | Doida | 348/208.12 |
| 8,488,015 B2 | 7/2013 | Prentice et al. | 348/221.1 |
| 2004/0263640 A1* | 12/2004 | Silverbrook | H04N 5/225 348/222.1 |
| 2009/0245685 A1* | 10/2009 | Makii | H04N 5/23248 382/276 |
| 2013/0235232 A1* | 9/2013 | Yang | H04N 5/2353 348/229.1 |

OTHER PUBLICATIONS

Chapman, Alister, "Exposing and Using S-log2 on the Sony A7s. Part One: Gamma and Exposure", retrieved Aug. 19, 2014, from http://www.xdcam-user.com/2014/08/exposing-and-using-slog2-on-the-sony-a7s-part-one-gamma-and-exposure/, 22 pages.

Wang et al., "Image Quality Assessment: From Error Visibility to Structural Similarity", IEEE Transactions on Image Processing, vol. 13, No. 4, Apr. 2004, 14 pages.

Yuan et al., "Automatic Exposure Correction of Consumer Photographs", Microsoft Research Asia, Computer Vision-ECCV 2012, Springer Berlin Heidelberg, 2012, 14 pages.

Zone System. (Oct. 11, 2014). In Wikipedia, The Free Encyclopedia. Retrieved Nov. 2014, from http://en.wikipedia.org/w/index.php?title=Zone_System&oldid=629181186, 7 pages.

* cited by examiner

Primary Examiner — Gevell Selby
(74) Attorney, Agent, or Firm — Alston & Bird LLP (57) ABSTRACT

In accordance with an example embodiment of the present invention, a method is disclosed. An image is provided. The image is transformed. A similarity score is determined. The similarity score corresponds to a comparison of the image and the transformed image. A camera setting is predicted based on the determined similarity score.

20 Claims, 8 Drawing Sheets

METHOD AND APPARATUS FOR AUTOMATIC PREDICTION OF DYNAMIC EXPOSURE

TECHNICAL FIELD

The invention relates to image processing and, more particularly, to automatic prediction of dynamic exposure.

BACKGROUND

As electronic devices continue to become more sophisticated, these devices provide an increasing amount of functionality and features. One area gaining popularity in the consumer market is improved camera functionality and features. In particular, setting the right exposure can be one of the most important parameters, but at the same time quite challenging to capture a good quality photograph. In the event of incorrect exposure time settings, the images come out over-exposed or under-exposed. The details are lost and colors are washed out among other things.

Despite the availability of sophisticated metering techniques on high-end DSLR cameras to aid the user, they cannot be really put to use for automated capture by various data collection systems. Additionally, although photographs can be corrected to a certain degree after capture, the correction is not at that point to fully recover oversaturated or undersaturated image areas.

Due to increased demand in functionality from electronic devices, there is a need to provide improved devices having increased capabilities while maintaining robust and reliable product configurations.

SUMMARY

Various aspects of examples of the invention are set out in the claims.

In accordance with one aspect of the invention, a method is disclosed. An image is provided. The image is transformed. A similarity score is determined. The similarity score corresponds to a comparison of the image and the transformed image. A camera setting is predicted based on the determined similarity score.

In accordance with another aspect of the invention, an apparatus is disclosed. The apparatus includes at least one processor, and at least one memory including computer program code. The at least one memory and the computer program code configured to, with the at least one processor, cause the apparatus to perform at least the following. Transform an image. Determine a similarity score. The similarity score corresponds to a comparison of the transformed image and another image. Predict a camera setting based on the determined similarity score.

In accordance with another aspect of the invention, a computer program product is disclosed. The computer program product includes a computer-readable medium bearing computer program code embodied therein for use with a computer. The computer program code includes code for transforming an image. Code for determining a similarity score. The similarity score corresponds to a comparison of the transformed image and another image. Code for predicting a camera setting based on the determined similarity score.

BRIEF DESCRIPTION OF THE DRAWINGS

Example embodiments of the present invention, are now described with reference to accompanying drawings in which.

DETAILED DESCRIPTION OF THE DRAWINGS

Example embodiments of the present invention and their potential advantages are understood by referring to FIGS. 1 through 9 of the drawings.

Figure 1:
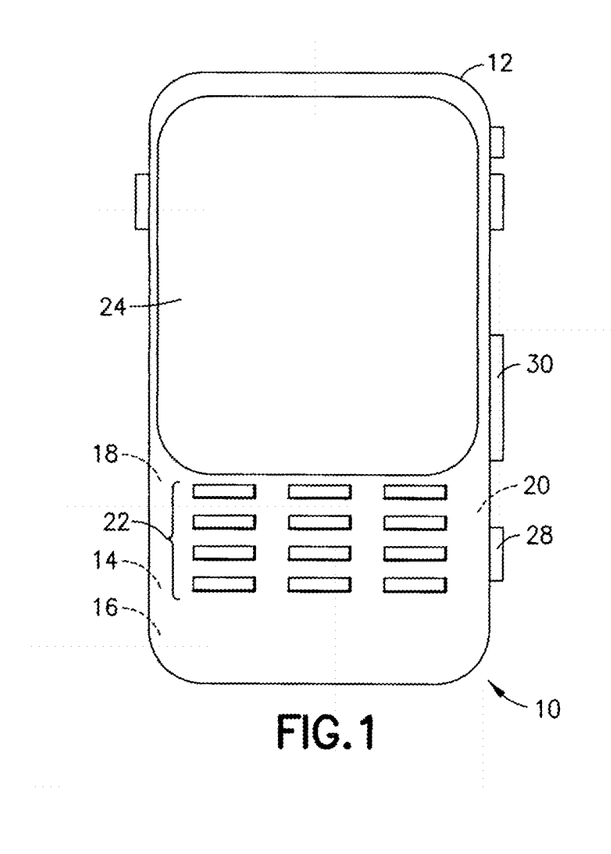
FIG. 1 is a front view of an electronic device incorporating features of the invention.

Referring to FIG. 1, there is shown a front view of an electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

According to one example of the invention, the device 10 is a multi-function portable electronic device. However, in alternate embodiments, features of the various embodiments of the invention could be used in any suitable type of portable electronic device such as a digital camera, a mobile phone, a gaming device, a music player, a notebook computer, a handheld global positioning system, a vehicle navigations system, a terrestrial image capture system, or a personal digital assistant, for example. In addition, as is known in the art, the device 10 can include multiple features or applications such as a camera, a music player, a game player, or an Internet browser, for example. The device 10 generally comprises a housing 12, a transmitter 14, a receiver 16, an antenna 18 (connected to the transmitter 14 and the receiver 16), electronic circuitry 20, such as a controller (which could include a processor, for example) and a memory for example, within the housing 12, a user input region 22 and a display 24. It should be understood that although the user input region 22 is illustrated as a keypad, various exemplary embodiments of the invention may include touch-screen technology at the user input region 22. The display 24 could also form a user input section, such as a touch screen. It should be noted that in alternate embodiments, the device 10 can have any suitable type of features as known in the art.

Figure 2:
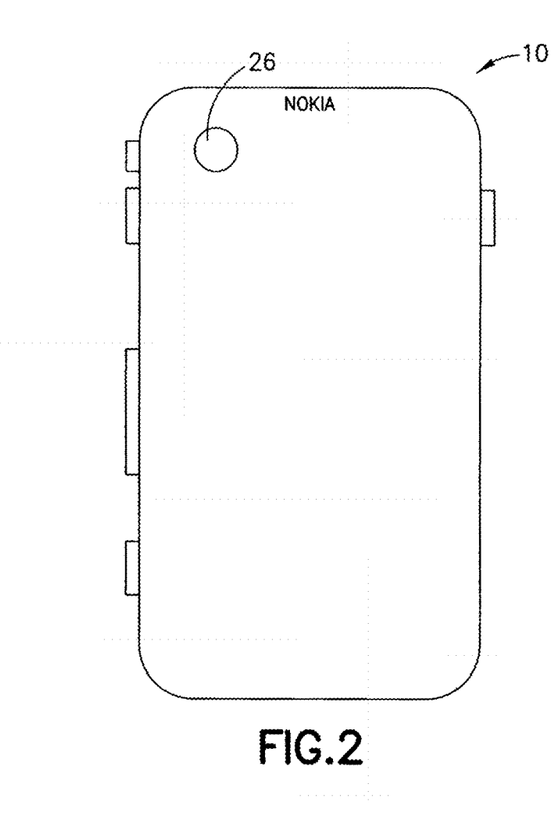
FIG. 2 is a rear view of the electronic device shown in FIG. 1.

Referring now to FIG. 2, the electronic device 10 further comprises a camera 26 which is shown as being rearward facing (for example for capturing images and/or video) but may alternatively or additionally be forward facing (for example for video calls). The camera 26 may be controlled by a shutter actuator 28 and optionally by a zoom actuator 30. However, any suitable camera control functions and/or camera user inputs may be provided.

Figure 3:
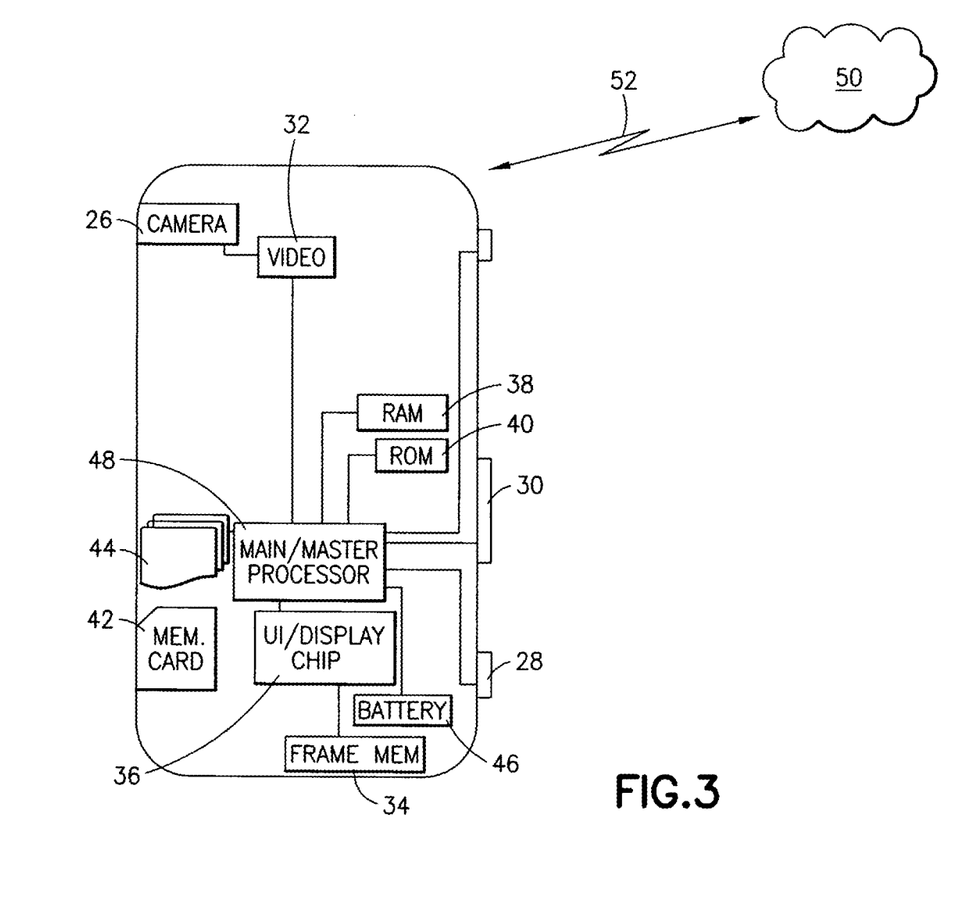
FIG. 3 is a schematic drawing illustration various internal components of the electronic device shown in FIG. 1.
Figure 4:
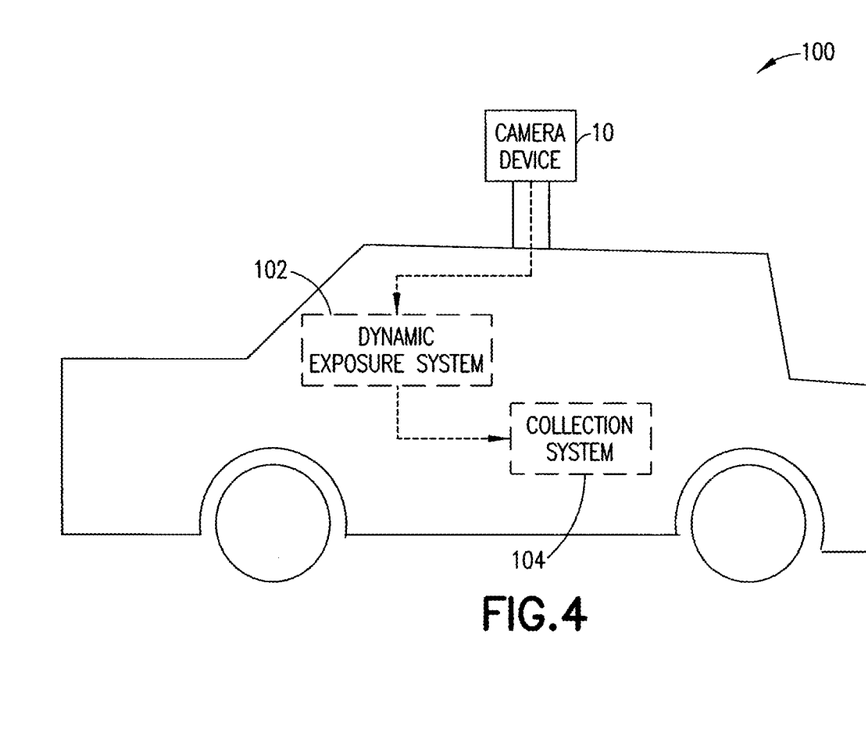
FIG. 4 is side view of a collection vehicle including the device shown in FIG. 1.

Referring now to FIG. 3, signals to and from the camera 26 pass through an image/video processor 32 which encodes and decodes the various image frames. The graphical display interface 24 is refreshed from a frame memory 34 as controlled by a user interface chip 36 which may process signals to and from the display interface 24 and/or additionally process user inputs from the keypad 22 and elsewhere.

Throughout the apparatus are various memories such as random access memory RAM 38, read only memory ROM 40, and in some embodiments removable memory such as the illustrated memory card 42. Various programs 44 are stored in one or more of these memories. All of these components within the device 10 are normally powered by a portable power supply such as a battery 46.

The aforesaid processors 32, 36, if embodied as separate entities in the device 10, may operate in a slave relationship to the main processor 48 which may then be in a master relationship to them. Embodiments of this invention are relevant to the image/video processor (or graphics processing unit [GPU]) 32, though it is noted that other embodiments need not be disposed there but may be disposed across various chips and memories as shown or disposed within another processor that combines some of the functions described above. Any or all of these various processors may access one or more of the various memories, which may be on-chip with the processor or separate therefrom.

Note that the various chips that were described above may be combined into a fewer number than described and, in a most compact case, may all be embodied physically within a single chip.

It should further be noted that certain embodiments of the device 10 may also include one or more secondary radios such as a wireless local area network radio WLAN and a Bluetooth® radio, which may incorporate an antenna on-chip or be coupled to an off-chip antenna. Additionally, the device 10 may be generally configured to provide connectivity with a network 50 (see link 52), such as a telephone network and/or a data communications network (e.g., the internet, cloud server(s) [cloud], or any suitable cloud computing configuration, for example).

While various exemplary embodiments of the invention have been described in connection with the device 10 shown in FIGS. 1-3, one skilled in the art will appreciate that the various exemplary embodiments are not necessarily so limited and that in alternate embodiments any suitable type of device incorporating features of the exemplary embodiments of the invention may be provided. For example, referring now to FIG. 4, the device 10 comprises a camera device mounted to a collection vehicle 100. The collection vehicle 100 may be a street level capture vehicle, a terrestrial image capture vehicle, or any other suitable type of vehicle. According to some embodiments of the invention, the vehicle 100 may further comprise a dynamic exposure system 102 and a collection system 104 connected to the camera device 10. However, in alternate embodiments any suitable features may be provided.

According to various exemplary embodiments of the invention, improvements in image processing for digital cameras are provided. For example, various exemplary embodiments, along with other features, provide a fast and efficient method to dynamically predict the exposure for deployment on an electronic device, such as a terrestrial capture system, for example.

Figure 5:
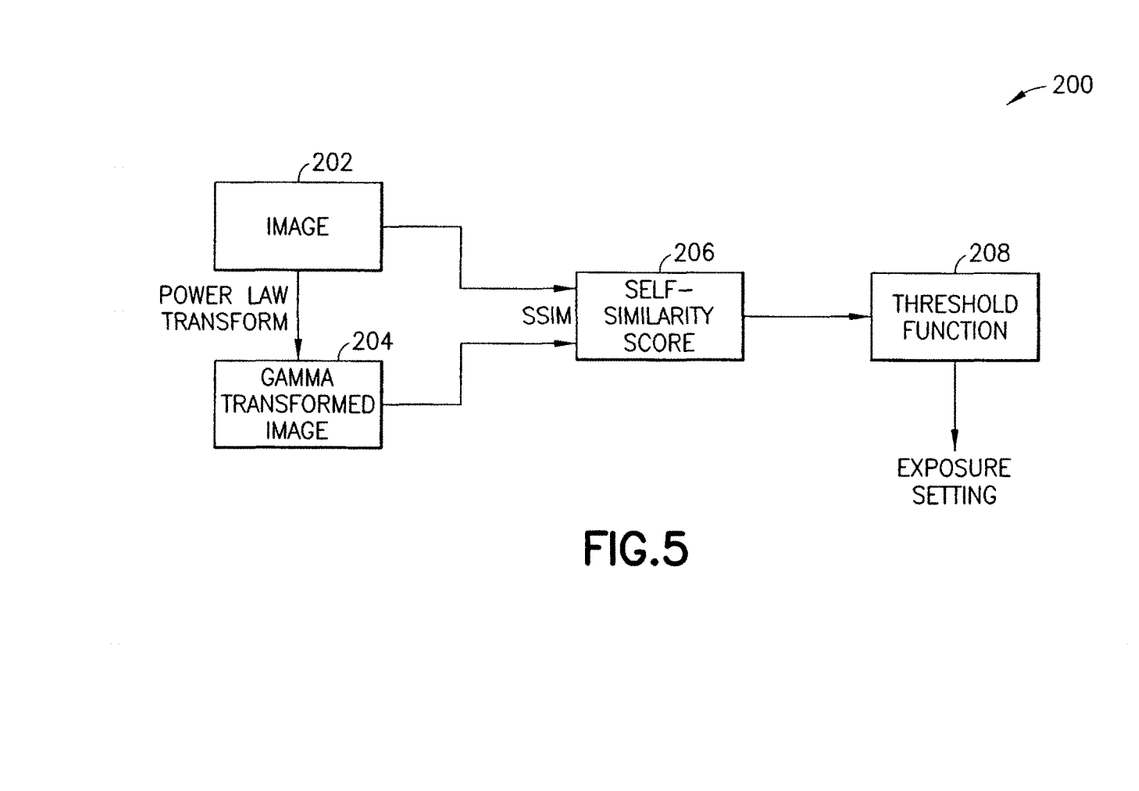
FIG. 5 is a block diagram of an exemplary method of the device shown in FIG. 1.

Various exemplary embodiments are based on a statistical analysis of the presently captured image. Referring now also to FIG. 5 illustrating method 200. The method 200 includes providing the presently captured image (at block 202) and measuring the information loss that happens after the image is passed through a gamma transformation (at block 204). The information loss between image and its gamma-transformed version is quantified using structural similarity index [SSIM] (at block 206). Since the image is compared with a variant of itself, it is agnostic of content, which makes it really effective powerful. According to various exemplary embodiments, the information loss is maximal for under exposed images and minimal for over exposed images. This observation forms one of the central themes of the algorithm based on which the camera settings are predicted.

For example, if the camera has five settings: 1-5 in the order of exposure time, then the setting predictor works as follows based on the SSIM score. The thresholds have been set based on subjective ratings and can be changed based on the human recommendations (at block 208). It should be noted that the camera may have more the five settings. For example, while various exemplary embodiments of the invention mention of the importance of the right exposure settings for a scene, one skilled in the art will appreciate that these settings relate to the actual exposure parameters. Additionally, since the SSIM value is a continuous scale, the exposure settings can be divided into as many settings as one would like (wherein labels actually correspond to the actual exposure parameters on the camera). Furthermore, in some embodiments there can be provided ground data of right ISO and shutter exposure settings on images, such that mapping between the SSIM and the setting can be learned.

if (SSIM<=0.52)
status="extremely dark"; setting=5
else if (S>0.52 && S<=0.65)
status="very dark"; setting=4
else if (S>0.65 && S<=0.72)
status="dark"; setting=3
else if (S>0.72 && S<=0.87)
status="normal"; setting=2
else if (S>0.87 && S<0.96)
status="bright"; setting=1

Figure 6:
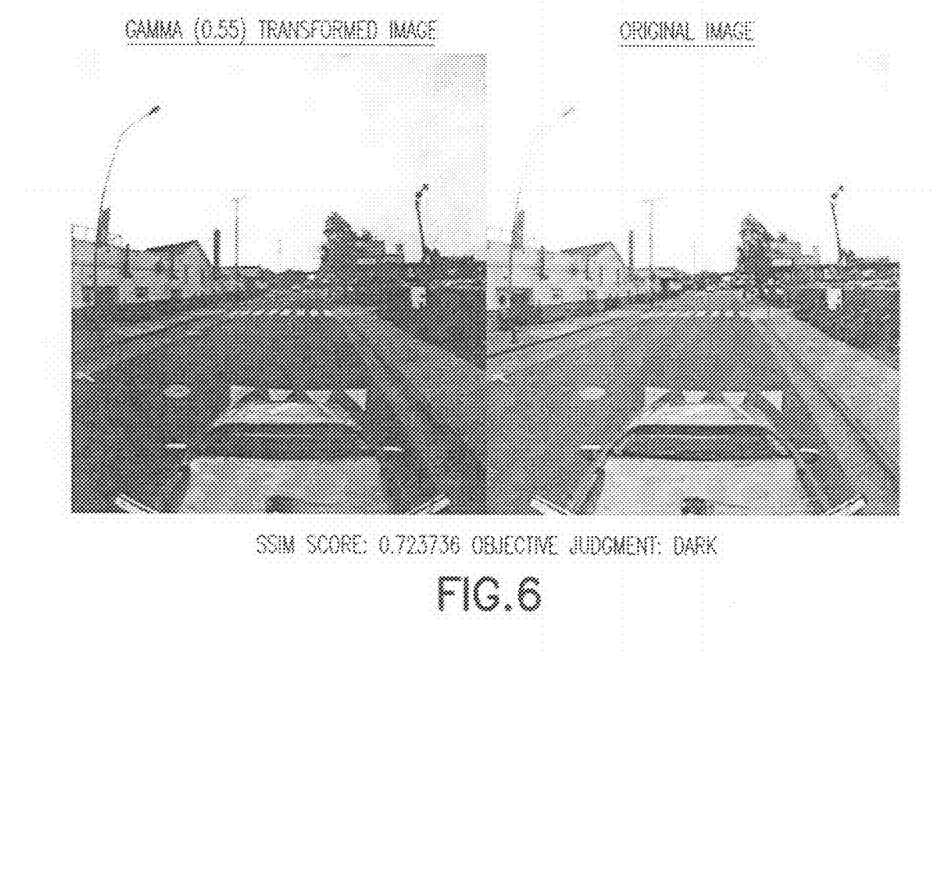
FIGS. 6-9 are example images corresponding to the method shown in FIG. 5.
Figure 7:
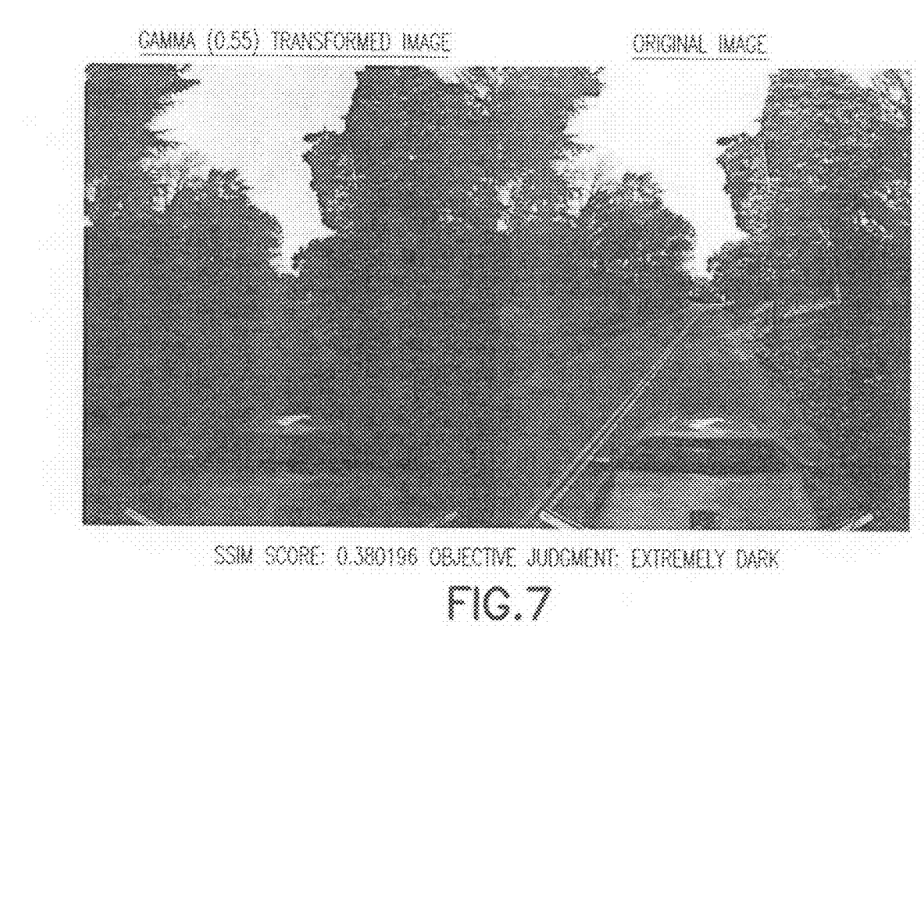
Figure 8:
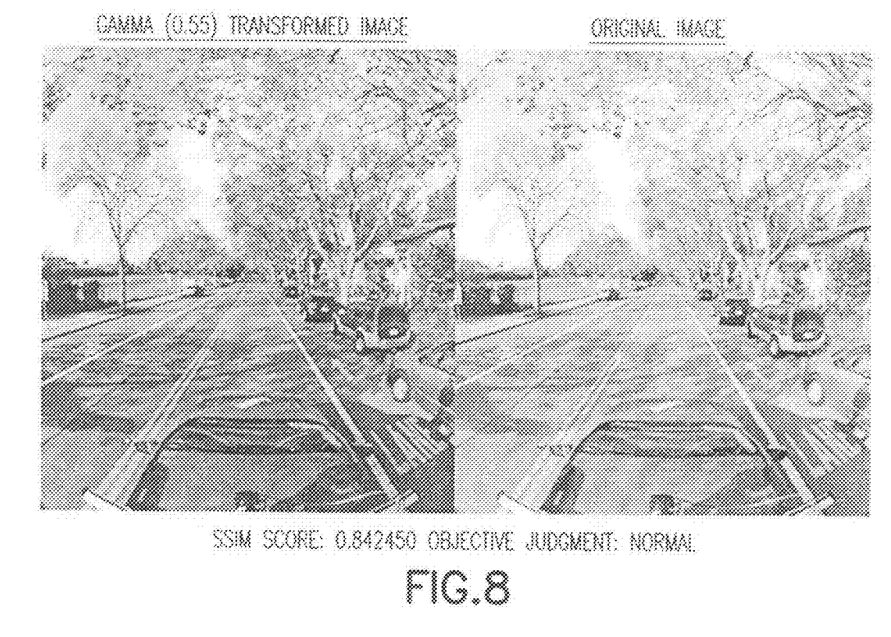
Figure 9:
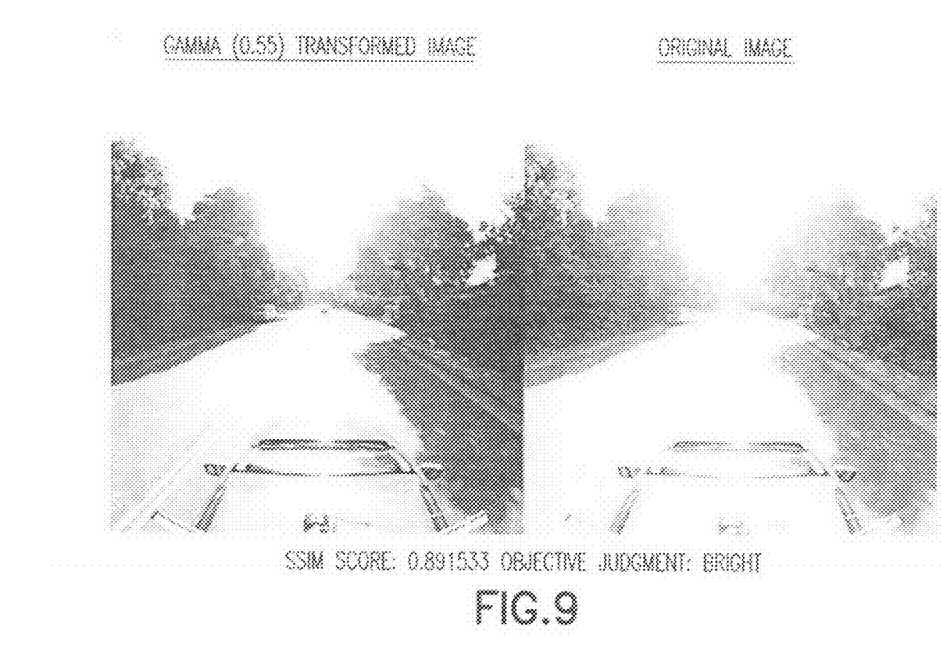

Referring now also to FIGS. 6-9, there are shown examples where a value of Gamma of 0.55 was used for the power law transformation, however it should be noted that in alternate embodiments any suitable value may be provided. For example FIG. 6 shows an original image on the right and the corresponding transformed image on the left. In FIG. 6 the SSIM score is 0.723736, and the Objective Judgment is 'dark'. In FIG. 7 the SSIM score is 0.380196, and the Objective Judgment is 'extremely dark'. In FIG. 8 the SSIM score is 0.842450, and the Objective Judgment is 'normal'. In FIG. 9 the SSIM score is 0.891533, and the Objective Judgment is 'bright'. It should be noted that the images in FIGS. 6-9 and the corresponding SSIM scores, and the Objective Judgment are provided as non-limiting examples.

Without in any way limiting the scope, interpretation, or application of the claims appearing below, a technical effect of one or more of the example embodiments disclosed herein is a dynamic exposure prediction technique that makes use of the similarity of the test image with its gamma-transformed version. Since the approach is based on self-comparison, it alleviates the problem of content dependence. Another technical effect of one or more of the example embodiments disclosed herein is that the approach only uses two simple image-processing functions of gamma transformation and structural similarity, which makes it efficient and deployable on real time terrestrial, capture systems. Another technical effect of one or more of the example embodiments disclosed herein is that the approach is simple, fast and efficient. Another technical effect of one or more of the example embodiments disclosed herein is that being a self-similarity based technique, it is content agnostic and works well with different kinds of scenes. Another technical effect of one or more of the example embodiments disclosed herein is providing automated capture data collection systems installed on terrestrial street level capture systems. Another technical effect of one or more of the example embodiments disclosed herein is providing a content agnostic approach based on self similarity of an image with its gamma transformed version. Another technical effect of one or more of the example embodiments disclosed herein is providing for a transform test image via gamma transformation. Another technical effect of one or more of the example embodiments disclosed herein is a method to compute SSIM by comparing test image with transformed image. Another technical effect of one or more of the example embodiments disclosed herein is selecting the exposure setting based on SSIM value. Another technical effect of one or more of the example embodiments disclosed herein is providing for the dynamic/automatic prediction of exposure value.

One of the technical effects of any one or more of the exemplary embodiments provide an improved method to dynamically predict the exposure during capture when compared to conventional configurations. This is generally because correctly identifying the exposure settings is crucial for capturing a good quality photograph. Otherwise, images lose the details or their colors are washed out. Many of the conventional techniques generally use intensity based measurements to determine the exposure. Many of the conventional techniques borrow the concept of "Zone" from Ansel Adams' Zone System where the entire luminance range [0, 1] is equally divided into 11 zones ranging from black to middle gray to pure white. The mean intensity value is referred as its corresponding exposure in each zone. Such an intensity based measurement makes the approach content dependent. For instance, this conventional technique fails to recognize the difference between correctly exposed dark objects and poorly exposed bright objects. Secondly, this conventional technique only predicts the exposure for the segments of the image. It is not clear how the conventional techniques can be used to deliver a single number indicating the exposure of the image. Thirdly, many of the conventional approaches use a graph based segmentation approach to segment the image in to different regions making it very expensive to be deployed as a real time prediction technique.

According to various exemplary embodiments of the invention, a method for automatic prediction of dynamic exposure in terrestrial street level capture systems is provided. For example, users drive around cars and capture image and lidar data. One problem is that users may want to change the exposure automatically as per the climate conditions. This is because the drive is started with an initial exposure and then the user may want the exposure to be gradually changed between consecutive images as per conditions (not more than a f-stop by 1 or 2 at a time). If the exposure is changed drastically between images while capture, the drive would look bad on the whole.

In some exemplary embodiments of the invention provide for the correct exposure setting for a scene, which could be dark, well lit or extremely bright. Additionally, use of SSIM between a power law transformed version of the input image and the image itself, followed by thresholding the same to decide one of five (extremely dark to very bright) settings (for example, based on a camera set up that only has five settings).

While various exemplary embodiments of the invention have been described in connection with five settings, one skilled in the art will appreciate that the various exemplary embodiments of the invention are not necessarily so limited, and that in alternate embodiments, any suitable number of settings could be provided. Further, it should be noted that while various exemplary embodiments describe the importance of the preferred exposure settings for a scene in regards to the labeling of an image into one of five categories, one skilled in the art will understand that any described labels correspond to the actual exposure parameters on the camera. Additionally, since the SSIM value is a continuous scale, in some embodiments it can be divided into any suitable number of settings.

It should further be noted that in some embodiments of the invention a scene/image can be categorized into one of five types, however in alternate embodiments any suitable number of exposure settings (combination of ISO, aperture and shutter) could be provided. For example, with ground data of right ISO and shutter exposure settings on images, mapping between the SSIM and the setting can be learned.

According to some further embodiments of the invention, a learning framework can be used, with images and corresponding labels (as many categories as needed) given by experts/humans (such as from a large ground truth dataset, for example) to make the system more robust.

It should be understood that components of the invention can be operationally coupled or connected and that any number or combination of intervening elements can exist (including no intervening elements). The connections can be direct or indirect and additionally there can merely be a functional relationship between components.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Embodiments of the present invention may be implemented in software, hardware, application logic or a combination of software, hardware and application logic. The software, application logic and/or hardware may reside on the device, a server or a network component. If desired, part of the software, application logic and/or hardware may reside on the device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 3. A computer-readable medium may comprise a computer-readable storage medium that may be any media or means that can contain or store the instructions for use by or in connection with an instruction execution system, apparatus, or device, such as a computer.

Below are provided further descriptions of various non-limiting, exemplary embodiments. The below-described exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

In one exemplary embodiment, a method comprising providing an image; transforming the image; determining a similarity score, wherein the similarity score corresponds to a comparison of the image and the transformed image; and predicting a camera setting based on the determined similarity score.

A method as above wherein the transforming of the image comprises a gamma transformation of the image.

A method as above wherein the similarity score comprises a structural similarity index (SSIM).

A method as above wherein the comparison of the image and the transformed image comprises a measure of the loss of information.

A method as above wherein the predicting of the camera setting comprises predicting a camera exposure setting.

A method as above wherein the camera setting comprises one or more of, an extremely bright, a bright setting, a normal setting, a dark setting, a very dark setting, and an extremely dark setting.

A method as above further comprising a threshold function wherein threshold values of the similarity score correspond to different camera settings.

In another exemplary embodiment, an apparatus, comprising: at least one processor; and at least one memory including computer program code, the at least one memory and the computer program code configured to, with the at least one processor, cause the apparatus to perform at least the following: transform an image; determine a similarity score, wherein the similarity score corresponds to a comparison of the transformed image and another image; and predict a camera setting based on the determined similarity score.

An apparatus as above wherein the transformed image comprises a gamma transformed image.

An apparatus as above wherein the similarity score comprises a structural similarity index (SSIM), wherein a SSIM value is a continuous scale.

An apparatus as above wherein the comparison of the images comprises a measure of the loss of information.

An apparatus as above wherein the camera setting comprises five or more camera exposure settings.

An apparatus as above wherein the camera setting comprises one or more of, an extremely bright, a bright setting, a normal setting, a dark setting, a very dark setting, and an extremely dark setting.

An apparatus as above wherein a threshold function comprises threshold values of the similarity score which correspond to different camera settings.

An apparatus as above wherein the apparatus comprises an electronic device.

In another exemplary embodiment, a computer program product comprising a computer-readable medium bearing computer program code embodied therein for use with a computer, the computer program code comprising: code for transforming an image; code for determining a similarity score, wherein the similarity score corresponds to a comparison of the transformed image and another image; and code for predicting a camera setting based on the determined similarity score.

A computer program product as above wherein the transforming of the image comprises a gamma transformation of the image.

A computer program product as above wherein the similarity score comprises a structural similarity index (SSIM) having a continuous scale.

A computer program product as above wherein the comparison of the image and the transformed image comprises a measure of the loss of information.

A computer program product as above wherein the predicting of the camera setting comprises predicting a camera exposure setting.

In another exemplary embodiment, a method to correctly identify/predict the camera exposure settings while capturing image is disclosed. Captured image (i.e. test image) is passed through a gamma transformation. Image and its gamma transformation are compared to measure the loss of information and this value is quantified as a structural similarity index (SSIM). This SSIM value is compared with the predefined range of SSIM values. Based on the range in which SSIM value lies appropriate exposure setting is selected out of category extremely dark, very dark, dark, normal, and bright.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   providing an image to an electronic device comprising at least one processor;
   transforming the image by the electronic device;
   determining a similarity score by the electronic device, wherein the similarity score corresponds to a comparison of the image and the transformed image; and
   predicting, by the electronic device, a camera setting based on the determined similarity score.

2. The method of claim 1 wherein the transforming of the image comprises a gamma transformation of the image.

3. The method of claim 1 wherein the similarity score comprises a structural similarity index (SSIM).

4. The method of claim 1 wherein the comparison of the image and the transformed image comprises a measure of the loss of information.

5. The method of claim 1 wherein the predicting of the camera setting comprises predicting a camera exposure setting.

6. The method of claim 1 wherein the camera setting comprises one or more of, an extremely bright, a bright setting, a normal setting, a dark setting, a very dark setting, and an extremely dark setting.

7. The method of claim 1 further comprising a threshold function wherein threshold values of the similarity score correspond to different camera settings.

8. An apparatus, comprising:
   at least one processor; and
   at least one memory including computer program code
      the at least one memory and the computer program code configured to, with the at least one processor, cause the apparatus to perform at least the following:
   transform an image;
   determine a similarity score, wherein the similarity score corresponds to a comparison of the transformed image and another image; and
   predict a camera setting based on the determined similarity score.

9. The apparatus of claim 8 wherein the transformed image comprises a gamma transformed image.

10. The apparatus of claim 8 wherein the similarity score comprises a structural similarity index (SSIM), wherein a SSIM value is a continuous scale.

11. The apparatus of claim 8 wherein the comparison of the images comprises a measure of the loss of information.

12. The apparatus of claim 8 wherein the camera setting comprises five or more camera exposure settings.

13. The apparatus of claim 8 wherein the camera setting comprises one or more of, an extremely bright, a bright setting, a normal setting, a dark setting, a very dark setting, and an extremely dark setting.

14. The apparatus of claim 8 wherein a threshold function comprises threshold values of the similarity score which correspond to different camera settings.

15. The apparatus of claim 8 wherein the apparatus comprises an electronic device.

16. A computer program product comprising a non-transitory computer-readable medium bearing computer program code embodied therein for use with a computer, the computer program code comprising:
   code for transforming an image;
   code for determining a similarity score, wherein the similarity score corresponds to a comparison of the transformed image and another image; and
   code for predicting a camera setting based on the determined similarity score.

17. The computer program product of claim 16 wherein the transforming of the image comprises a gamma transformation of the image.

18. The computer program product of claim 16 wherein the similarity score comprises a structural similarity index (SSIM) having a continuous scale.

19. The computer program product of claim 16 wherein the comparison of the image and the transformed image comprises a measure of the loss of information.

20. The computer program product of claim 16 wherein the predicting of the camera setting comprises predicting a camera exposure setting.

* * * * *